(12) United States Patent
Kataoka et al.

(10) Patent No.: US 7,518,273 B2
(45) Date of Patent: Apr. 14, 2009

(54) MOTOR

(75) Inventors: Nakaba Kataoka, Kyoto (JP); Keita Nakanishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 459 days.

(21) Appl. No.: 11/298,497

(22) Filed: Dec. 12, 2005

(65) Prior Publication Data
US 2006/0125334 A1  Jun. 15, 2006

(30) Foreign Application Priority Data
Dec. 13, 2004  (JP) .............................. 2004-359358

(51) Int. Cl.
H02K 29/14 (2006.01)
(52) U.S. Cl. .................................. 310/68 B
(58) Field of Classification Search ............... 310/68 B, 310/156.05
See application file for complete search history.

(56) References Cited
U.S. PATENT DOCUMENTS 4,217,508 A * 8/1980 Uzuka .......................... 310/46
5,717,268 A * 2/1998 Carrier et al. ............ 310/156.06
6,417,587 B1 * 7/2002 Komatsu et al. ............ 310/68 B
6,680,553 B1 * 1/2004 Takano ....................... 310/68 B
6,750,574 B2 * 6/2004 Okazaki et al. ............. 310/68 B
6,954,014 B2 * 10/2005 Ohiwa et al. ............... 310/68 B

FOREIGN PATENT DOCUMENTS

| JP | 2000-156963 | 6/2000 |
| JP | 2002-252958 | 9/2002 |
| JP | 2004-48904 | 2/2004 |

* cited by examiner

Primary Examiner—Dang D Le
(74) Attorney, Agent, or Firm—Westerman, Hattori, Daniels & Adrian, LLP.

(57) ABSTRACT

In a motor, an sensor magnet is attached to a shaft and three Hall sensors for detecting the position of the sensor magnet are mounted on a circuit board. By using neodymium-iron-boron base rare earth magnet having radial anisotropy as a sensor magnet, the detection accuracy for the position of a field magnet via the sensor magnet by the Hall sensor can be improved.

18 Claims, 5 Drawing Sheets

MOTOR

FIELD OF THE INVENTION

The present invention relates to an electric motor.

BACKGROUND OF THE INVENTION

A sensor such as a Hall sensor for use in the electric motor detects a change in magnetic field by a sensor magnet provided separately from a field magnet for generating a rotation torque. The position of a magnetic pole of the field magnet is detected and drive current is changed over based on an output from the sensor so as to rotate the rotor.

For example, technology of using a magnet holding ring in which a plurality of thin plate like magnets are provided at an equal interval along its periphery in a brushless DC motor has been disclosed.

Because such a sensor magnet is an isotropic magnet, lines of magnetic force pass through the inside of the magnet when magnetic force is produced and thus, magnetization up to near a boundary between N pole and S pole is difficult. Thus, improvement of the accuracy of detecting the position of the field magnet has a limit.

SUMMARY OF THE INVENTION

The electric motor according to an embodiment of the present invention includes a static part having a stator, a rotor part having a field magnet for generating a torque around a central axis with respect to the stator, and a bearing part for supporting the rotor part rotatably with respect to the static part around the central axis.

The rotor part includes a sensor magnet that is a substantially ring-like rare earth anisotropic magnet and magnetized in multiple poles.

The static part includes a sensor disposed so as to oppose the sensor magnet, for detecting the position of the sensor magnet.

According to the electric motor of the embodiment of the present invention, the detection accuracy for the position of the field magnet can be improved.

DETAILED DESCRIPTION OF THE PREFERRED EMBODIMENTS

A preferred embodiment of the present invention will be described with reference to FIGS. 1-5. When the positional relation or direction of each member is explained with up/down or right/left sides in the description of the present invention, the positional relation or direction on drawings is indicated, but any positional relation or direction when the present invention is incorporated in an actual machine is not indicated.

First Embodiment

Figure 1:
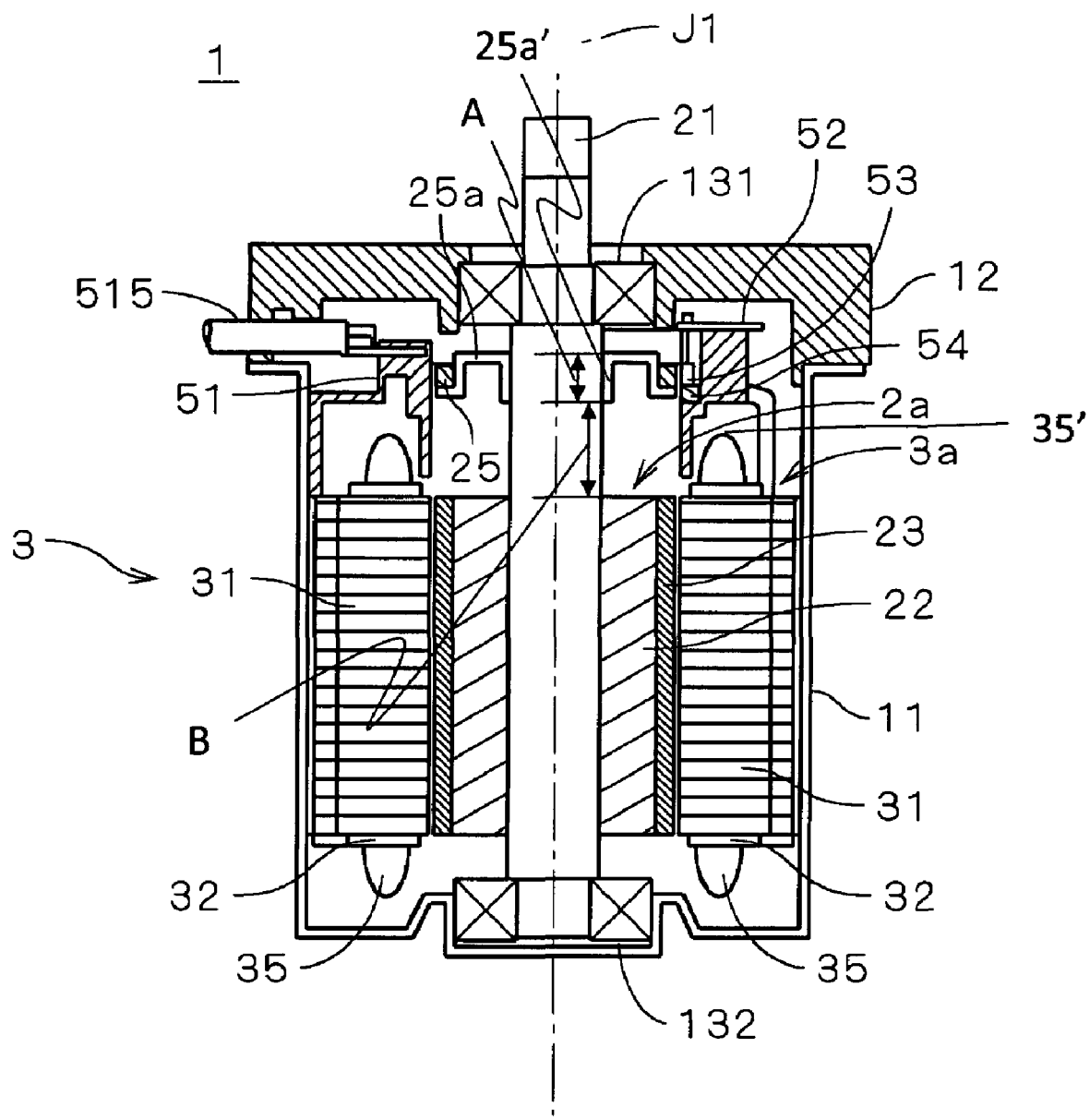
FIG. 1 is a longitudinal sectional view of a motor according to a first embodiment.

A motor 1 is a 3-phase brushless motor, which is used, for example, as a drive source for assisting for steering in an automobile power steering. In the meantime, representation of parallel oblique lines in a small sections of the section of FIG. 1 is omitted. The motor 1 is covered with a cylindrical housing 11 whose top is open in FIG. 1 and a cover portion 12 which closes the opening of the housing 11 and having an opening in its center.

Ball bearings 131, 132 are mounted on the opening of the cover portion 12 and on the bottom face of the housing 11 so that a shaft 21 is supported rotatably by those ball bearings 131, 132. A cylindrical rotor yoke 22 made of magnetic material is mounted on the shaft 21 within the housing 11 and a cylindrical field magnet 23 which is magnetized in multiple poles is fixed on the outer peripheral face of the rotor yoke 22.

On the other hand, a stator 3 is mounted on the inner peripheral face of the housing 11 such that it opposes the field magnet 23. The stator 3 is disposed such that a central axis J1 of the stator 3 aligns with the central axis of the shaft 21. The stator 3 includes a plurality of teeth 31 disposed radiantly from the inner peripheral face of an annular portion of magnetic core around the central axis J1 such that their front ends are directed to the central axis J1. That is, the plurality of the teeth extend from the inner peripheral face of the housing 11 toward the shaft 21 and the field magnet 23. The stator 3 includes an insulator 32 for covering the plurality of the teeth 31 and coil 35 which is wound around the plurality of the teeth 31 over the insulator 32 into multiple layers. The coil 35 is formed by winding conductive wires around the plurality of the teeth 31 and the insulator 32 in the vertical direction (direction of the central axis J1).

A bus bar 51 to which wiring member formed of a plurality of metallic plates for supplying a drive current to the coil 35 of the stator 3 is molded is mounted on the side of the cover 12 of the stator 3. A wiring 515 extending outward and conductive wire of each coil 35 are connected to the bus bar 51. A circuit board 52 equipped with a Hall sensor 53 and the like is mounted on the side of the cover portion 12 of the bus bar 51.

In the motor 1, a rotor part 2a includes the rotor yoke 22 and the field magnet 23 and the like as its main part. And in the motor 1, a stator part 3a fixed in the housing 11 includes the stator 3, the bus bar 51, the circuit board 52 and the like as its main part. Further, in the motor 1, the ball bearings 131, 132 are bearing part which supports the rotor part 2a rotatably with respect to the stator part 3a around the central axis J1. When drive current is supplied to the stator 3 through the bus bar 51, torque is generated between the stator 3 and the field magnet 23 around the central axis J1, so as to rotate the rotor part 2a.

An annular sensor magnet 25 having an outside diameter substantially equal to the outside diameter of the field magnet 23 is disposed on the side of the cover 12 of the field magnet 23 on the shaft 21. The sensor magnet is mounted on the shaft 21 via a flange portion 25a formed of magnetic material. Because in the rotor part 2a, the flange portion 25a covers the bottom side (that is, side facing the field magnet 23 and the stator 3) of the sensor magnet 25, interference of magnetic field among the sensor magnet 25, the field magnet 23 and the stator 3 can be prevented. On the other hand, various electronic components are mounted on the side of the bus bar 51 of the circuit board 52 and three hole sensors 53 for detecting the position of the sensor magnet 25 are mounted so as to project downward. The hole sensor 53 is held by a sensor holder 54. The position of the sensor magnet 25 means a relative position of the sensor magnet 25 with respect to the hole sensor 53 of a magnetic pole (same for the position of the field magnet 23). The flange portion 25a has a radially inside part 25a'. The flange portion 25a is fixed on the shaft 21 at the radially inside part 25a'. The radially inside part 25a' has a height A in the axial direction of the shaft. The sensor magnet 25 is fixed on the flange portion 25a. The flange portion 25a is spaced from the field magnet 23 with a distance B more than the height A.

The top end 35' of the coil 35 of the stator 3 is located lower than the sensor magnet 25.

The sensor magnet 25 is magnetized in multiple poles and the magnetization position and width of the plural magnetic poles (that is, an angle with respect to the central axis J1) coincide with the magnetization position and width of the plural magnetic poles of the field magnet 23). The Hall sensor 53 is disposed to oppose the outer peripheral face (that is, side face opposite to the central axis J1) of the sensor magnet 25. When the position of the sensor magnet 25 is detected by the Hall sensor 53, the position of the field magnet 23 is indirectly detected. Then, drive current to the stator 3 is controlled based on a detection result. Meanwhile, the magnetization position and width of the magnetic holes of the sensor magnet 25 and the field magnet 23 do not always need to coincide with each other and the relations of the magnetization position and width between the magnetic poles of the both magnets only need to be evident. In other words, the sensor magnet 25 only needs to be magnetized in multiple poles corresponding to the field magnet 23 around the central axis J1.

As the sensor magnet 25 and the field magnet 23, rare earth magnet manufactured of the same material, preferably, rare earth magnet based on neodymium-iron (Fe)-boron (B) containing neodymium (Nd) is used. Both the magnets have radial anisotropy (that is, radial magnetic field orientation around the central axis J1).

A manufacturing method of the sensor magnet 25 and the field magnet 23 will be described here. First, magnet material composed of mainly neodymium, iron and boron is prepared and that magnet material is pressed at a normal temperature and after that, pressed again at a high temperature so that it is hardened. Subsequently, by hot backward extrusion of pushing a cylindrical member having a diameter smaller than the inside diameter of a mold against magnet material within the cylindrical mold, the magnet material is formed cylindrically while being supplied with radial anisotropy. The magnet material can be supplied with radial anisotropy easily by hot extrusion. At this time, the magnet material is processed in various ways to a member (that is, original member of the both magnets, hereinafter referred to as original member) for the sensor magnet 25 and the field magnet 23. Because the inner peripheral face of the cylindrical original member is formed at a high accuracy, any processing after the extrusion is not necessary.

Next, the cylindrical original member is cut at right angle to the central axis into a predetermined length to produce members for the sensor magnet 25 (hereinafter referred to as first original member) and the field magnet 23 (hereinafter referred to as second original member). The first original member and the second original member are subjected to machining and surface treatment as required.

The first original member and the second original member are attached to the shaft 21 through the flange and rotor yoke 22, respectively. Then, by magnetizing the first original member and second original member in multiple poles at the same time by means of a single magnetization yoke, the sensor magnet 25 and the field magnet 23 in which the magnetization position and width of the plural magnetic poles coincide with each other are manufactured. By manufacturing the sensor magnet 25 and the field magnet 23 from a single original member, both the magnets can be manufactured with substantially equal diameter and the original members of the sensor magnet 25 and the field magnet 23 can be magnetized easily at the same time. As a result, the magnetization position and width of each magnetic pole of the sensor magnet 25 and the field magnet 23 can be matched accurately.

Figure 2:
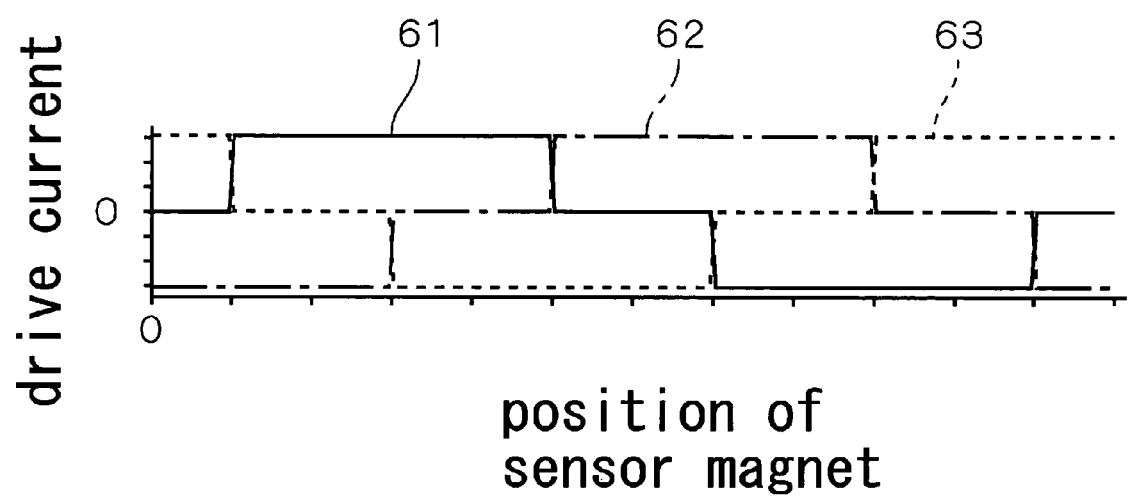
FIG. 2 is a diagram showing drive current of the motor.

FIG. 2 is a diagram showing drive current flowing through the coil 35 of the motor 1 and lines 61-63 indicate drive current flowing through each of the 3-phase coil 35. In the motor 1, when the position of the rotating sensor magnet 25 is detected by the Hall sensor 53 and a boundary face between the N pole and S pole of the sensor magnet 25 pass in front of the Hall sensor 53, drive currents flowing through each phase are changed over so as to achieve rectangular wave drive as shown in FIG. 2.

Figure 3:
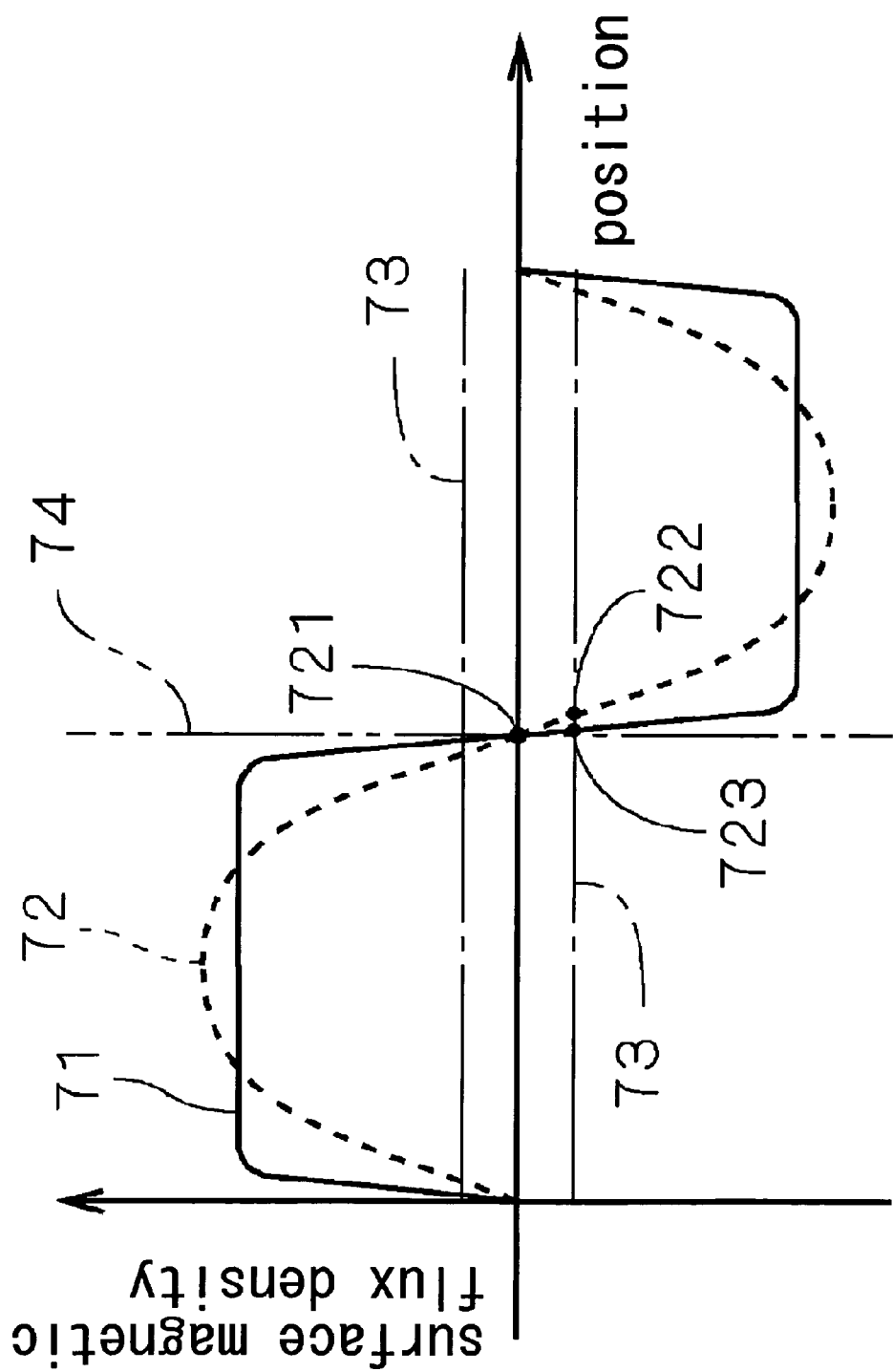
FIG. 3 is a diagram showing the relation between the position of a sensor magnet on the outer peripheral face and surface magnetic flux density.

FIG. 3 is a diagram showing the relation between a position on the outer peripheral face of the sensor magnet 25 and surface magnetic flux density. The position on the outer peripheral face is expressed with an angle around the central axis J1 from a predetermined reference position in the annular sensor magnet 25. FIG. 3 indicates surface magnetic flux density of adjoining N pole (upper portion with respect to a lateral axis in the same Figure) and S pole (lower portion with respect to the lateral axis in the same Figure). A solid line 71 in FIG. 3 indicates surface magnetic flux density of the sensor magnet 25. Dotted line 72 in FIG. 3 indicates surface magnetic flux density when isotropic magnet material is magnetized in multiple poles like the sensor magnet 25 as comparison. Two dot and dash lines 73 indicate a detection limit of the Hall sensor 53 and an area sandwiched by the two dot and dash lines 73 indicate a blind sector of the Hall sensor 53. A two-dot and dash line 74 corresponds to a boundary face between the N pole and S pole.

As shown in FIG. 3, the Hall sensor 53 has the blind sector. Thus, when the isotropic magnet is used as a sensor magnet, detection of changes from the N pole to the S pole (that is, passage of a boundary face at a position of the Hall sensor 53) is carried out at not a point 721 (intersection between the line 72 and the line 74, corresponding to an actual position of the boundary face) but a point 722 (intersection between the line 72 and the lower line 73). Contrary to this, the sensor magnet 25 having radial anisotropy is magnetized strongly up to the vicinity of the boundary face at a magnetic pole so that its surface magnetic flux density distribution turns to trapezoidal wave and the degree of change in the surface magnetic flux density in the vicinity of the boundary face becomes larger than the isotropic magnet. Thus, detection of the boundary face is carried out at a point 723 (intersection between the line 71 and the lower line 73) and a deflection between the actual passage of the boundary face and detection of the boundary face (hereinafter referred to as defection of detection) is smaller as compared to a case where an isotropic magnet is used.

Figure 4:
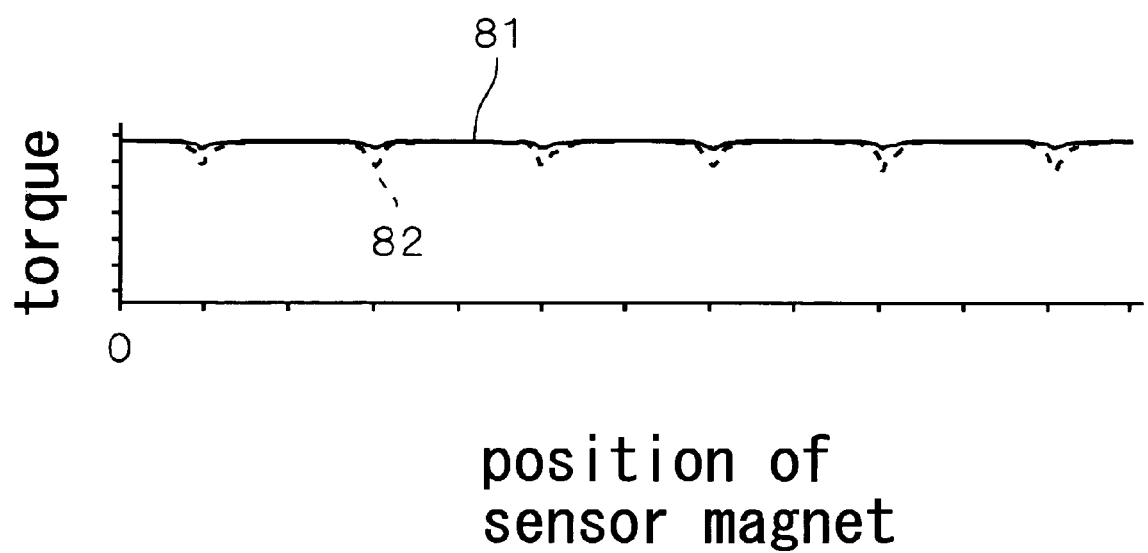
FIG. 4 is a diagram showing the torque of a motor.

FIG. 4 is a diagram showing a torque generated when the rotor part 2a is rotated by flow of the drive current through the coil 35. A solid line 81 in FIG. 4 indicates a torque of the motor 1 having the sensor magnet 25 having radial anisotropy. A dotted line 82 indicates a torque when it is assumed that the isotropic magnet is used as a sensor magnet. Because in the motor 1, boundary face detected as described above deflects from the position of an actual boundary face, changeover timing of the rectangular wave drive current delays slightly. Although a phenomenon (so-called torque ripple) that the torque decreases when the drive current is changed over occurs as shown in FIG. 4, because its detection deflection is smaller as compared to a case where the isotropic magnet is used as the sensor magnet, decrease of torque is suppressed.

Because as described above, the motor 1 uses rare earth magnet having radial anisotropy as the sensor magnet 25, the width of the sensor magnet 25 set within the blind sector of the Hall sensor 53 in the vicinity of the boundary face of an adjoining magnetic pole is smaller than that of an isotropic magnet. Thus, detection accuracy of the position of the field magnet 23 via the sensor magnet 25 set within the blind sector of the Hall sensor 53 can be improved. As a result, the drive current of the stator 3 can be controlled at a high accuracy thereby suppressing changes in torque when current is changed over and improving the drive efficiency of the motor 1. Then, because this motor 1 is used as a drive source for power steering, steering feeling is improved thereby assisting the steering operation smoothly.

Because in the motor 1, the Hall sensor 53 is disposed in the direction of anisotropy of the sensor magnet 25 so that it opposes a face having a large surface magnetic flux density of the sensor magnet 25, the position of the sensor magnet 25 can be detected at a high accuracy. Further, in the motor 1, its radial direction (that is, direction perpendicular to the axis) is designed at a higher accuracy than the axial direction. Thus, because the Hall sensor 53 is disposed to oppose the outer peripheral face of the sensor magnet 25, the detection accuracy of the position of the field magnet 23 can be improved. Because in the motor 1, the cheap Hall sensor 53 is used as a sensor while the position of the field magnet 23 can be detected accurately, the manufacturing cost of the motor 1 can be reduced.

Second Embodiment

Figure 5:
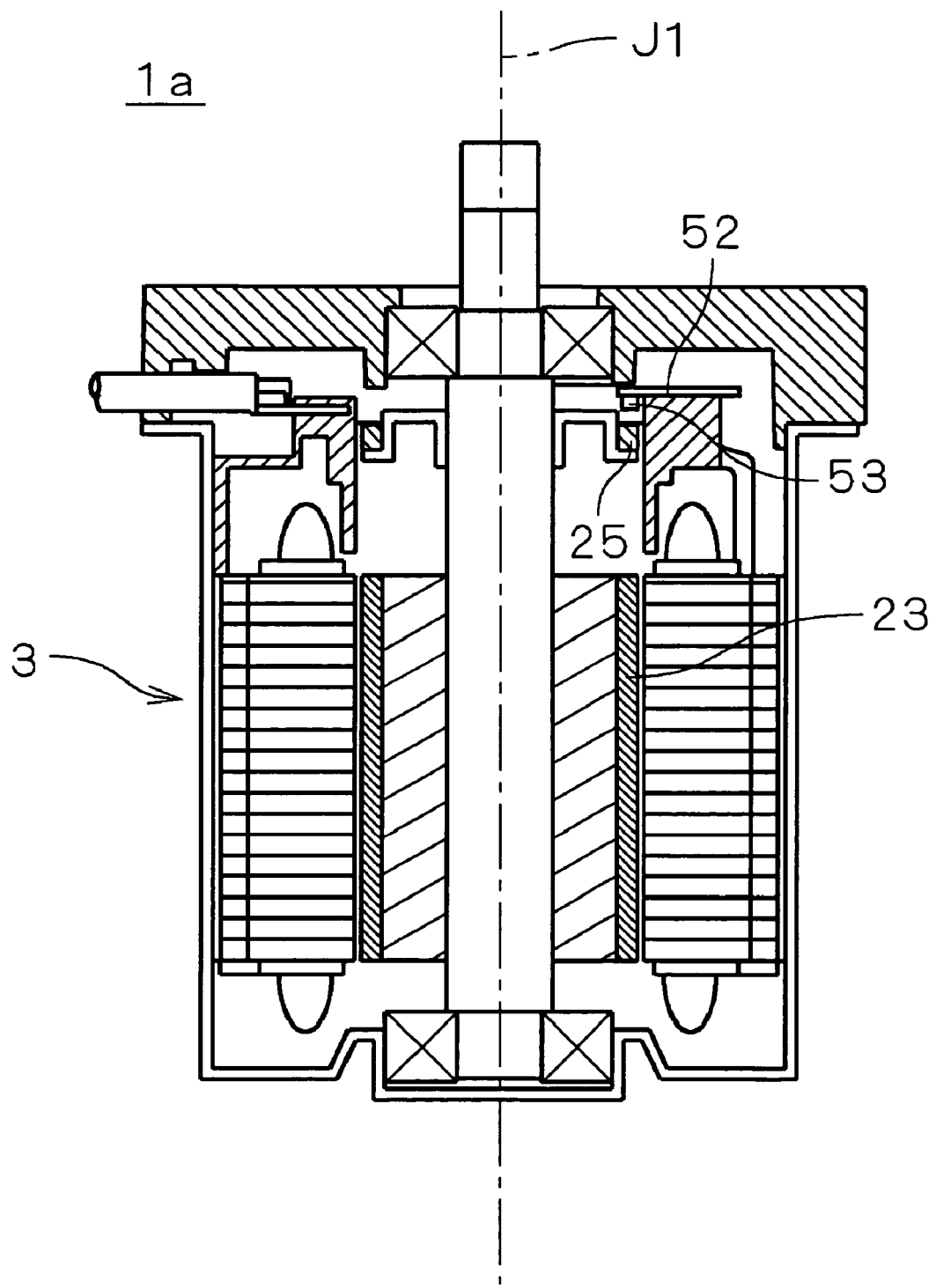
FIG. 5 is a longitudinal sectional view of the second embodiment.

FIG. 5 is a longitudinal sectional view of a motor 1a according to the second embodiment of the present invention. In the motor 1a, the Hall sensor 53 is mounted on the circuit board 52 such that it opposes the main upper face perpendicular to the central axis J1 of the sensor magnet 25 (that is, disposed in the axial direction). The other structure of the motor 1a is substantially the same as that in FIG. 1 and like reference numerals are attached.

In the motor 1a, the sensor magnet 25 has magnetic field orientation parallel to the central axis J1 (axial anisotropy). The sensor magnet 25 is a neodymium-iron-boron base rare earth magnet manufactured according to the same method as the first embodiment and magnetized in multiple poles corresponding to the field magnet 23 around the central axis J1.

Because in the motor 1a, the Hall sensor 53 can be mounted on the circuit board 52, the mounting of the Hall sensor 53 onto the circuit board 52 is simplified. Further because the Hall sensor 53 is disposed in the anisotropic direction of the sensor magnet 25 so that it opposes a face having a large surface magnetic flux density of the sensor magnet 25, the position of the sensor magnet 25 can be detected accurately.

Because the motor 1a uses a rare earth magnet having axial anisotropy as the sensor magnet 25, the degree of change in the surface magnetic flux density in the vicinity of the boundary face of an adjoining magnetic pole is larger than the isotropic magnet like the first embodiment. As a consequence, the width of the sensor magnet 25 set within the blind sector of the Hall sensor 53 in the vicinity of the boundary face is smaller that of an isotropic magnet, the detection accuracy about the position of the field magnet 23 via the sensor magnet 25 by the Hall sensor 53 can be improved. As a result, the drive current of the stator 3 can be controlled accurately thereby suppressing changes in torque when the drive current is changed over and improving the drive efficiency of the motor 1a.

Third Embodiment

The third embodiment is a modification of the first embodiment. In this embodiment, a second original member which is magnetized to be a field magnet is formed with a material different from that of the first original member, the second original member which is magnetized to be an isotropic rare earth magnet.

The isotropic field magnet generates rotational force with less cogging torque, while detection accuracy of the position of the field magnet is not deteriorated.

The embodiments of the present invention have been described above and the present invention is not restricted to the above embodiments but may be modified in various ways.

If considering that the motor of the above embodiment has high mechanical strength which inhibits itself from being damaged easily, is easily machined and relatively cheap, it is preferable to use neodymium-iron-boron base rare earth magnet as the sensor magnet 25. However, it is permissible to use other rare earth anisotropic magnet than neodymium-iron-boron base rare earth magnet, for example, samarium(Sm)-cobalt (Co) base rare earth anisotropic magnet.

From viewpoints of intensifying magnetic field to improve magnetic flux density to improve the accuracy of position detection, it is preferable to use as the sensor magnet 25 a magnet manufactured according to the above method in which content of magnet material is higher than a so-called bonded magnet obtained by solidifying the magnet material with resin. The bonded magnet can be applied if it is a rare earth anisotropic magnet. The manufacturing method of the rare earth anisotropic magnet is not limited to any particular one.

From viewpoints of reducing the manufacturing cost of the motor, it is preferable to use a cheap Hall sensor as a sensor for detecting the position of the sensor magnet 25. However, it is permissible to use other sensor than the Hall sensor such as a resolver having a high resolution although it is expensive, as required.

Although the motor of the above embodiment is of inner rotor type, it may be of outer rotor type. Further, this motor may be used for an electric brake system, electromagnetic suspension and transmission system as well as an electric power steering. Further, the motor may be used for various systems which assist directly an operation of other vehicles than automobile.

What is claimed is:

1. An electric motor comprising:
   a static part including an outer stator;
   a field magnet having a cylindrical shape;
   an inner rotor part having the field magnet for generating a torque around a central axis of a shaft with respect to the stator;
   a bearing part for supporting the inner rotor part rotatably with respect to the static part around the central axis;
   a sensor magnet that is a substantially ring-like rare earth anisotropic magnet and magnetized in multiple poles, the sensor magnet secured on the inner rotor part and arranged with the field magnet coaxially;
   a flange portion of a magnetic material disposed between the field magnet and the sensor magnet, wherein the flange portion has a radially inside part, wherein the flange portion is fixed on the shaft at the radially inside part, wherein the radially inside part has a height in the axial direction, wherein the sensor magnet is fixed on the flange portion, wherein the flange portion is spaced from the field magnet with a distance more than the height; and a sensor disposed at a radially outward portion opposed to the sensor magnet, for detecting the position of the sensor magnet.

2. The motor according to claim 1, wherein the sensor magnet has radial anisotropy.

3. The motor according to claim 2, wherein the sensor is disposed so as to oppose the outer peripheral face of the sensor magnet.

4. The motor according to claim 3, wherein the sensor magnet has an outside diameter substantially equal to the outside diameter of the field magnet.

5. The motor according to claim 1, wherein the sensor is disposed so as to oppose a main face perpendicular to the central axis of the sensor magnet.

6. The motor according to claim 1, wherein the sensor magnet is made of magnet material molded by hot extrusion so as to be supplied with anisotropy, the magnet material being magnetized.

7. The motor according to claim 1, wherein the sensor magnet is made of magnetic material molded in magnetic field so as to be supplied with anisotropy and sintered, the magnet material being magnetized.

8. The motor according to claim 1, wherein the sensor magnet is based on neodymium-iron-boron.

9. The motor according to claim 1, wherein the sensor is a Hall sensor.

10. The motor according to claim 1, the motor being used in system for assisting an operation of a vehicle.

11. The motor according to claim 1, the motor directly assisting the steering operation of the vehicle.

12. The motor according to claim 1, wherein the sensor magnet and the field magnet are formed with a single material.

13. The motor according to claim 1, wherein the sensor magnet is formed a material different from a material of the field magnet.

14. The motor according to claim 1, wherein the field magnet is a rare earth isotropy magnet.

15. The motor according to claim 1, wherein the flange portion covers a bottom side of the sensor magnet.

16. The motor according to claim 1, wherein the flange portion covers a side of the sensor magnet, the side facing the field magnet.

17. The motor according to claim 1, wherein the flange portion covers a side of the sensor magnet, the side facing the stator.

18. The motor according to claim 1, wherein the sensor magnet is located lower than a top end of a coil of the outer stator.

* * * * *